United States Patent [19]

Daniel et al.

[11] Patent Number: 4,649,772

[45] Date of Patent: Mar. 17, 1987

[54] PLANETARY WHEEL DRIVE ASSEMBLY

[75] Inventors: Steven A. Daniel, Marquette Heights; Laylock Rick A., Washington, both of Ill.

[73] Assignee: Caterpillar Inc., Peoria, Ill.

[21] Appl. No.: 751,929

[22] Filed: Jul. 5, 1985

[51] Int. Cl.[4] .......................... F16H 3/44; F16H 35/00
[52] U.S. Cl. ...................................... 74/785; 74/801; 74/391; 74/411.5; 180/10
[58] Field of Search ............... 74/782, 786, 788, 801, 74/391, 411.5, 785; 180/10, 255

[56] References Cited

U.S. PATENT DOCUMENTS

| 2,953,040 | 9/1960 | Christenson et al. | 74/801 |
|---|---|---|---|
| 3,115,204 | 12/1963 | Dence | 180/10 |
| 3,150,532 | 9/1964 | Bixby | 74/801 |
| 3,157,239 | 11/1964 | Bernotas | 180/51 |
| 3,301,359 | 1/1967 | Cole et al. | 192/4 |
| 3,365,986 | 1/1968 | Mazziotti | 74/801 |
| 3,754,625 | 8/1973 | Voth et al. | 192/4 |
| 4,010,830 | 3/1977 | Logus | 192/4 |
| 4,037,694 | 7/1977 | Keese | 192/4 |
| 4,142,615 | 3/1979 | Sidles et al. | 192/4 |
| 4,158,971 | 6/1979 | Szalai et al. | 74/391 |
| 4,317,498 | 3/1982 | Jirousek | 180/70 |
| 4,407,382 | 10/1983 | Dziuba et al. | 180/10 |
| 4,461,373 | 7/1984 | Pratt et al. | 74/391 |
| 4,562,903 | 1/1986 | Rogier | 74/801 |

Primary Examiner—Leslie Braun
Assistant Examiner—Martin Belisario
Attorney, Agent, or Firm—Charles E. Lanchantin, Jr

[57] ABSTRACT

A planetary wheel drive assembly includes a hollow spindle secured to a frame which provides the support for a wheel structure, an outboard planetary gear set and an inboard disc brake mechanism. The planetary gear set has a ring gear connected to the spindle, an input sun gear shaft, and a planet carrier conjointly driving the wheel structure. An inboard end member is removable to allow independent withdrawal of the disc brake mechanism disposed radially within the spindle when the wheel structure and the spindle are removed from the frame, and an outboard end member is releasable from the wheel structure to allow access to the planetary gear set.

6 Claims, 1 Drawing Figure

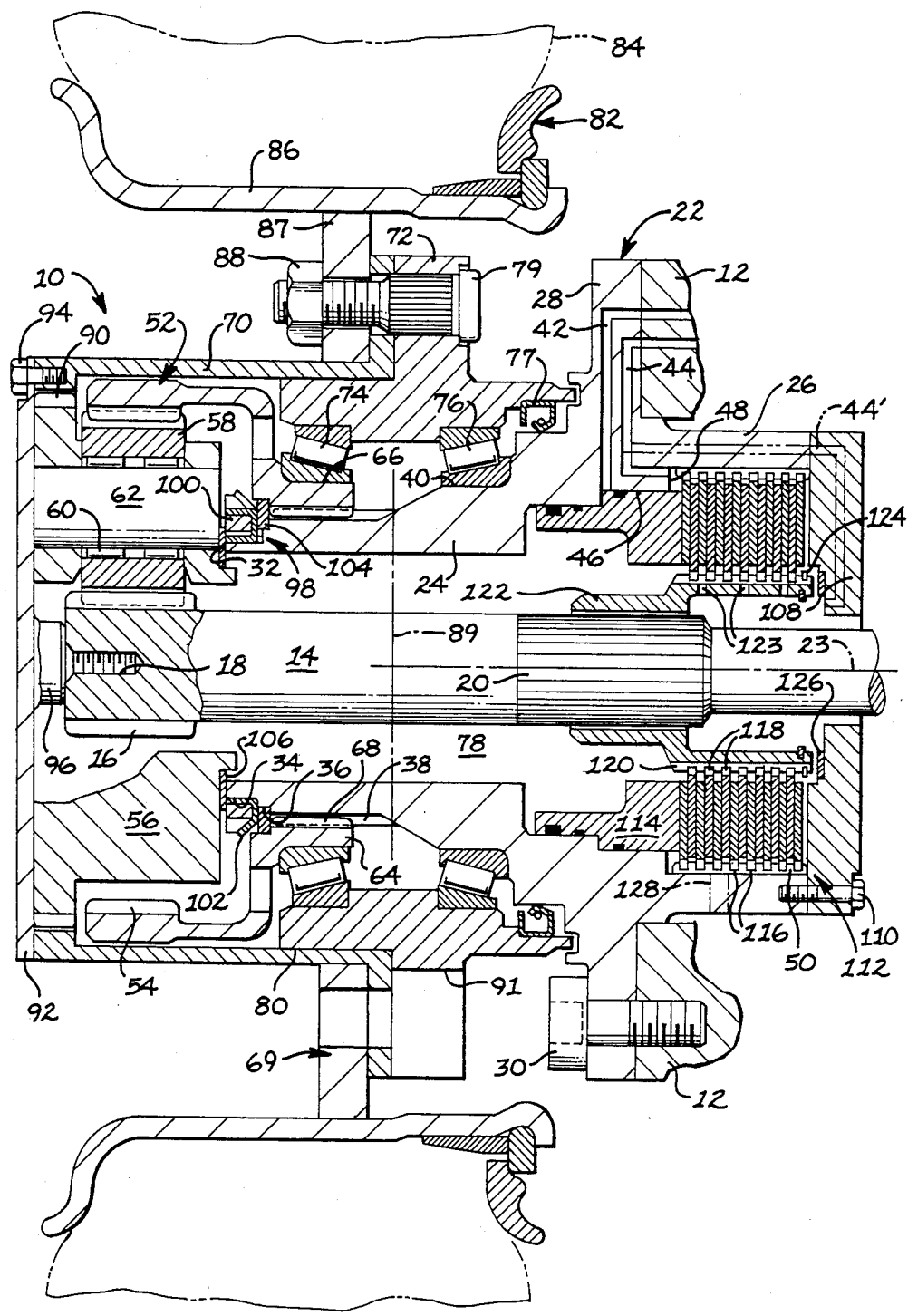

PLANETARY WHEEL DRIVE ASSEMBLY

TECHNICAL FIELD

This invention relates to a wheel drive assembly for a vehicle, and more particularly to a compact and serviceable wheel drive assembly incorporating a reduction planetary gear set and a wet disc brake mechanism therein.

BACKGROUND ART

Many vehicular wheel drive assemblies for tractors, lift trucks and the like employ planetary gear sets individually having an input sun gear, an output planet carrier, and a stationary ring gear. The planetary gear set provides the required speed reduction and corresponding torque increase between the differential and the wheel. Also, oil-cooled disc packs have been incorporated in the planetary wheel drive assemblies to provide the desired braking capacity. Such assemblies are shown, for example, by the following U.S. Patent Nos.: 3,115,204 issued Dec. 24, 1963 to D. S. Dence; 3,157,239 issued Nov. 17, 1964 to R. J. Bernotas; 3,301,359 issued Jan. 31, 1967 to C. R. Cole et al; 3,754,625 issued Aug. 28, 1973 to J. W. Voth et al; 4,010,830 issued Mar. 8, 1977 to A. T. Iogus et al; 4,037,694 issued July 26, 1977 to B. W. Keese; 4,142,615 issued Mar. 6, 1979 to P. Sidles, Jr. et al; and 4,317,498 issued Mar. 2, 1982 to N. F. Jirousek et al.

For the most part these wheel drive assemblies have proven to be very satisfactory. However, when they are downsized for vehicles where space is at a premium, such as for a lift truck, the serviceability of the components becomes adversely affected. Specifically, the overall width of the lift truck is selected so that it can maneuver in the narrow aisles of a factory or warehouse. Since the transverse width is limited, the space available for the planetary gear set, the wet disc brake mechanism and the supporting bearing assemblies also is limited.

As a result of such limitations in transverse width, there is the problem of where to put the disc brake mechanism relative to the planetary gear set in order to allow individualized and independent servicing thereof. Moreover, if the disc brake mechanism is positioned inside the stationary hollow spindle then the two opposed bearing assemblies that are mounted on the spindle and that support the wheel structure must be increased in diameter at substantial expense. Then too, it is desirable to locate these bearing assemblies at a maximum axially spaced condition conducive to better supporting the wheel structure, and with the mid-plane of the wheel or wheels mounted thereon being located generally centrally between the bearing assemblies for maximum balance.

Accordingly, what is needed is a sturdy and structurally compact planetary wheel drive assembly that incorporates a planetary gear set and a disc brake mechanism in locations that minimize the overall cost thereof, while allowing independent servicing and/or subassembly of these components with minimal effort and affect on the vehicle.

The present invention is directed to overcoming one or more of the problems set forth above.

DISCLOSURE OF THE INVENTION

In one aspect of the present invention a planetary wheel drive assembly has a stationary hollow spindle rotatably supporting a wheel structure, an input shaft, and a planetary gear set having a ring gear connected to the spindle, a sun gear driven by the input shaft, and a planet carrier drivingly connected to the wheel structure. A disc brake mechanism is arranged along the central axis radially within and connected directly to the spindle for controllably connecting the input shaft to the spindle, and an inboard end member can be released from the spindle to allow access to the disc brake mechanism. An outboard end member can be released from the wheel structure to allow access to the planetary gear set disposed adjacent thereto and to the input shaft.

By axially positioning the planetary gear set adjacent an outboard cover plate and the disc brake mechanism adjacent an inboard end plate, the distal outboard end of the spindle and the opposed bearing assemblies mounted on the spindle for support of the wheel structure can be decreased in diameter between them. The mid-plane of the wheel or wheels included with the wheel structure is generally located between the bearing assemblies for better load distribution. The planetary gear set is accessible from the outboard end of the wheel drive assembly without removing the wheel or the spindle from the frame of the vehicle. And, the disc brake mechanism is accessible for independent servicing from within the distal inboard end of the spindle after disconnecting a central mounting flange on the spindle from the frame and thereby removing the planetary wheel drive assembly and the wheel structure from the frame.

BRIEF DESCRIPTION OF THE DRAWING

The sole FIGURE is a diagrammatic cross-sectional view of a planetary wheel drive assembly constructed in accordance with the present invention.

BEST MODE FOR CARRYING OUT THE INVENTION

Referring to the drawing, a planetary wheel drive assembly 10 is shown connected to a frame or hollow axle housing 12 of a wheeled vehicle. The outer end of an input axle shaft 14 defines an integral sun gear 16 and a blind threaded bore 18, and a coupling spline 20 is formed thereon axially inwardly of the sun gear. Although not illustrated, the axle shaft extends inwardly to be driven by a conventional power train and differential mechanism as is well known in the art.

A hollow spindle 22 having a central axis 23 forms the major support for the planetary wheel drive assembly 10 and includes a tubular outboard distal end 24, a tubular inboard distal end 26, and an enlarged diameter mounting flange 28 located intermediate the distal ends. A plurality of threaded fasteners or bolts 30 extend through the flange and are screwthreadably received in the frame to releasably secure the entire planetary wheel drive assembly to the vehicle. The outboard end of the spindle has an end surface 32, an externally threaded surface 34 adjacent thereto, a cylindrical guide seat 36, a coupling spline 38 and a cylindrical bearing seat 40 arranged in series thereon. First and second fluid passages 42 and 44 are defined centrally therein which are respectively in open communication with a stepped cylindrical inner bore 46 and an axially inwardly facing annular surface 48 immediately outboard of an internal coupling spline 50.

A planetary gear set 52 is located immediately outwardly of the end surface 32 of the spindle 22 and includes the driving sun gear 16 of the input shaft 14, a ring gear 54, and a driven planet carrier 56. The planet carrier is adapted to rotatably support a plurality of planet gears 58 thereon, although only one is shown in the drawing. Each of the planet gears is mounted on a needle bearing 60 supported by a planet shaft 62 suitably secured to the planet carrier in the usual manner. The ring gear 54 has an integral hub 64 defining an external bearing seat 66 and an internal coupling spline 68 that intermeshes with the stationary external coupling spline 38 of the spindle.

A wheel structure 69 is conjointly driven by the planet carrier 56 and includes an annular output member 70 and a supporting hub 72. The output member 70 and supporting hub 72 are releasably secured together and are rotatably supported on the spindle 22 by an opposed pair of tapered roller bearing assemblies 74 and 76 respectively mounted on the bearing seats 66 and 40. An oil seal ring 77 is located between the spindle and hub to define an enclosed chamber 78 within the planetary wheel drive assembly 10 and the axle housing 12. A plurality of serrated studs 79 are secured to the hub 72 and the output member 70 is mounted thereon through a cylindrical guide surface 80 defined on the hub. The wheel structure also includes a conventional wheel 82 including a tire 84, a tire-supporting rim 86, and a radially inwardly extending mounting flange 87 mounted on the studs. A plurality of retaining nuts 88 are screwthreadably mounted on the studs to securely clamp the flange, the output member and the hub together. It is to be noted that the mounting flange 87 is axially located relatively close to a mid-plane 89 disposed centrally between the two bearing assemblies 74 and 76 and normal to the transverse axis 23 in order to better distribute operating loads to the bearing assemblies. The periphery of the supporting hub 72 has a plurality of scalloped notches 91 to provide recesses sufficient to allow outward removal of the bolts 30 from the frame 12.

Advantageously, the planet carrier 56 and tubular output member 70 are releasably connected together for joint rotation by tooth means or a coupling spline joint 90 which is preferably of a diameter larger than the overall outside diameter of a theoretical cylinder arranged along the central axis 23 and just encompassing the planet gears 58. An outboard end member or cover plate 92 is releasably and sealingly secured to the output member 70 by a plurality of fasteners or bolts 94 screwthreadably received in the output member. A steel thrust button 96 is connected to the cover plate for limiting axially outward movement of the axle shaft 14.

A conventional retaining device 98 is incorporated within the planetary wheel drive assembly 10 for rotatably securing the ring gear hub 64 on the spindle 22 and enabling the axial spacing between the opposed bearing assemblies 74 and 76 to be adjusted. The retaining device includes a bearing lock nut 100, an annular locking ring 102, and a thrust washer 104 of the usual type which is disposed on the guide seat 36 and urged by the lock nut axially inwardly against the ring gear hub 64.

In general, the planet carrier 56 is free to travel axially limitedly between the cover plate 92 and the end surface 32 of the spindle 22. However, a wear washer 106 is preferably concentrically supported by the planet carrier in axial alignment with the annular end surface 32 to control frictional wear since relative motion is experienced therebetween in use.

Looking now at the inboard distal end 26 of the spindle 22, an end member or end plate 108 is releasably secured to the spindle by means of a plurality of fasteners or bolts 110 screwthreadably received in the spindle. This end plate provides access to a wet disc brake mechanism 112 including an annular actuating piston 114 sealingly seated within the stepped inner bore 46, a plurality of reaction plates 116 interlockingly engaged with the internal coupling spline 50, and a plurality of friction discs 118 interleaved with the plates and interlockingly engaged with an external coupling spline 120 formed on a tubular connecting element 122. The connecting element also has an internal coupling spline so that it can be interlockingly engaged with the coupling spline 20 on the axle shaft 14, and axially outward travel of the connecting element is limited by an external retaining ring 124 releasably secured thereto. On the other hand, axially inward movement of the connecting element is limited by a thrust washer 126 seated on the end plate 108.

Industrial Applicability

In operation, power from the drive train of the vehicle is delivered to the axle shaft 14 causing the sun gear 16 to rotate about the central axis 23. The sun gear intermeshes with the planet gears 58 which are caused to rotate intermeshingly against the stationary ring gear 54. This causes the planet carrier to rotate at a reduced speed relative to the speed of the axle shaft and in the same relative direction. Since the output member 70 rotates with the planet carrier because of the spline joint 90, wheel 82 and the supporting hub 72 are caused to rotate together on the bearing assemblies 74 and 76 seated on the spindle 22.

Assuming that it is desired to slow down or to stop the vehicle, fluid under pressure is delivered from a conventional brake control system, not shown, to the first passage 42 in the spindle 22 and to a region behind the activating piston 114 of the disc brake mechanism 112. This urges the piston to the right when viewing the drawing against the interleaved plates 116 and discs 118, and forces them clampingly together against the reacting end plate 108. In this way the connector element 122 and the input shaft 14 rotatable therewith can be gradually and controllably brought to a stop. Simultaneously, lubricating fluid under pressure can be directed through the second passage 44 and axially inwardly at a diameter generally corresponding with the coupling spline 50. Such circulating fluid is forced radially inwardly through a plurality of grooves conventionally defined in the friction discs 118, although not shown. This circulating cooling fluid is sufficient to urge the plates and discs apart, and to retract the piston by urging it to the left a limited degree upon the release of pressure fluid in the first piston activating passage 42. A plurality of radial passages 123 are defined in the connecting element 122 to permit the cooling fluid to travel radially inwardly to the usual sump in the axle housing 12.

Alternatively, lubricating fluid can be directed through both the spindle 22 and the end plate 108 through a second passage 44' as shown in phantom lines. Rather than being directed radially inwardly upon exiting the passage 44, cooling fluid exiting from the alternate second passage 44' is directed radially outwardly through the plurality of radial passages 123 in the connecting element 122. The lubricating fluid would thereafter travel through the grooves in the friction discs 118 and out a plurality of return passages 128 to the sump in the axle housing 12.

When it is desired to inspect the planetary gear set 52 in the field, the cover plate 92 can be removed by screwthreaded release of the bolts 94 from the tubular output member 70. At this point a tool can be inserted in the threaded bore 18 and the axle shaft 14 pulled axially outwardly from within the chamber 78. In the instant embodiment, the planet carrier 56 and the planet gears 58 can also be pulled axially outwardly from within the ring gear 54 for closer inspection without having to remove the tubular output member 70. The end play of the bearing assemblies 74 and 76 can thereafter be adjusted by opening up the retaining device 98 and screwthreadably readjusting the bearing lock nut 100.

If it is desired to remove the ring gear 54 from the spindle 22, the nuts 88 can be released from the studs 79 and the wheel 82 and the tubular output member 70 pulled outboard. Release of the retaining device 98 can thereafter allow the ring gear to be pulled off with the hub 72, the outboard bearing assembly 74 and the radially outer portion of the inboard bearing assembly 76. Such manipulations can be made without any effect on the disc brake mechanism 112.

On the other hand, if it is desired to inspect or to service the disc brake mechanism 112, the entire planetary wheel drive assembly 10 can be conveniently separated from the frame 12 by the release of the circle of bolts 30. Then, by release of the bolts 110, the inboard end plate 108 can be removed to allow full access to the plates 116 and the discs 118 for inspection thereof. This can be accomplished without any detrimental influence on the planetary gear set 52 or on the bearing assemblies 74 and 76.

Thus, it may be appreciated that in the instant embodiment the bearing assemblies 74 and 76 can be adjusted, and the axle shaft 14 and planetary gear set 52 serviced with the wheel drive assembly 10 on the vehicle and without exposing the disc brake mechanism 12 to harm. When the axle shaft is pulled outwardly, the tubular connector element 122 remains in position with the discs 118 so that it is a simple matter to later reinsert the spline 20 of the axle shaft interlockingly into the connector element. However, the planetary wheel drive assembly 10 can be released from the vehicle should it be necessary to service or inspect the disc brake mechanism 112 independently.

Furthermore, the outboard distal end portion 24 of the spindle is of a reduced diameter and generally smaller than the outside diameter of the disc brake mechanism 112. In this regard note that if the interleaved plates 116 and discs 118 were placed radially within the bearing assemblies 74 and 76 they would have to be increased in diameter, and the seal ring 77 and the retaining device 98 would be larger at increased cost. Moreover, more plates and discs would be required to achieve the same braking effort because of restrictions on the radial dimensions.

While only one tire 84 is illustrated, it should be clear that a pair of tires can be mounted on the mounting flange 87 near the bearing mid-plane 89 without departing from the spirit of the present invention.

Other aspects, objects and advantages can be obtained from a study of the disclosure, the drawing, and the appended claims.

We claim:

1. In a planetary wheel drive assembly including a stationary hollow spindle releasably secured to a frame and having first and second ends and a mounting flange located between and axially spaced from each of said ends and being arranged along a central axis, an input shaft, a planetary gear set having a ring gear connected to the hollow spindle, a planet carrier, a sun gear driven by the input shaft, and a plurality of planet gears rotatably mounted on the planet carrier and engaging the sun and ring gears, and a wheel structure rotatably supported on the periphery of the second end of the hollow spindle and conjointly driven by the planet carrier, the improvement comprising:

disc brake means connected radially within and substantially directly to the hollow spindle at the first end thereof between said mounting flange and said first end for controllably connecting the input shaft to the hollow spindle for stopping rotation thereof;

a first end member releasably secured to the first end of the hollow spindle and providing access to the disc brake means contained within the hollow spindle along the central axis and allowing withdrawal of the disc brake means when the hollow spindle is removed from the frame; and a second end member releasably secured to the wheel structure and providing access to the planetary gear set disposed adjacent thereto and to the input shaft when the second end member is removed from the wheel structure.

2. The planetary wheel drive assembly of claim 1 wherein the disc brake means includes a plurality of plates, a plurality of discs, and a piston movable axially to compress the plates and discs against the first end member when braking.

3. The planetary wheel drive assembly of claim 1 including first and second bearing assemblies intermediate the second end of the hollow spindle and the wheel structure, the planetary gear set being disposed axially between the first bearing assembly and the second end member and the disc brake means being disposed axially between the second bearing assembly and the first end member.

4. A planetary wheel drive assembly including a hollow spindle having first and second ends and a mounting flange located between and axially spaced from each of said ends and being releasably secured to a frame, a planetary gear set having a ring gear connected to the hollow spindle, a driving sun gear shaft, a driven planet carrier, and a plurality of planet gears mounted on the planet carrier, and a wheel structure rotatably supported on the periphery of the second end of the hollow spindle, the improvement comprising:

means for connecting the wheel structure for conjoint rotation with the planet carrier;

second member means releasably connected to the wheel structure for providing servicing access to the planetary gear set;

disc brake means connected radially within and substantially directly to the hollow spindle at the first end thereof between said mounting flange and said first end for controllably connecting the sun gear shaft to the hollow spindle for stopping rotation thereof; and first member means releasably connected to the first end of the hollow spindle for providing servicing access to the disc brake means when the hollow spindle is released from the frame.

5. The planetary wheel drive assembly of claim 4 wherein the disc brake means includes a plurality of plates, a plurality of discs, and a piston movable axially to compress the plates and the discs against the first member means when braking.

6. The planetary wheel drive assembly of claim 4 including first and second bearing assemblies intermediate the second end of the hollow spindle and the wheel structure, the disc brake means being located axially between the bearing assemblies and the first member means.

* * * * *